United States Patent [19]
Lin

[11] Patent Number: 6,017,483
[45] Date of Patent: Jan. 25, 2000

[54] RECEPTACLE WITH A FUSED COATING ON AN INTERIOR SURFACE AND AN INJECTION MOLDING PROCESS FOR FORMING THE ARTICLE

[75] Inventor: Fu-Chung Lin, Wayne, N.J.

[73] Assignee: Becton Dickinson and Company, Franklin Lakes, N.J.

[21] Appl. No.: 08/896,339

[22] Filed: Jul. 18, 1997

[51] Int. Cl.[7] ................................................ B29C 33/52
[52] U.S. Cl. ..................... 264/317; 264/221; 264/242; 264/104; 264/105
[58] Field of Search .................................. 264/221, 242, 264/317, 104, 105

[56] References Cited

U.S. PATENT DOCUMENTS

| | | | |
|---|---|---|---|
| 3,852,194 | 12/1974 | Zine, Jr. ...................................... | 210/83 |
| 4,101,422 | 7/1978 | Lamont et al. ............................ | 210/84 |
| 4,590,026 | 5/1986 | Goto . | |
| 4,629,595 | 12/1986 | Ito . | |
| 5,246,666 | 9/1993 | Vogler et al. .............................. | 422/73 |
| 5,582,348 | 12/1996 | Erickson et al. . | |

FOREIGN PATENT DOCUMENTS

| | | |
|---|---|---|
| 56-086723 | 7/1981 | Japan . |
| 60-025718 | 2/1985 | Japan . |
| 60-025719 | 2/1985 | Japan . |
| 60-624041 | 11/1985 | Japan . |
| 63-042822 | 2/1988 | Japan . |

*Primary Examiner*—Charles Nold
*Attorney, Agent, or Firm*—Nanette S. Thomas, Esq.; Arthur D. Dawson

[57] ABSTRACT

An injection molding method for forming an article having a receptacle with a coating on an interior surface includes providing an injection molding tool with at least one cavity in one part and at least one core pin projecting from a second part having an outside surface. The core pin is sized to fit within the cavity with a clearance thereby defining a cavity space. The injection molding tool has an open position wherein the core pin is withdrawn from the cavity and a closed position wherein the core pin is disposed within the cavity for defining the cavity space. The method further sequentially then includes moving the injection molding tool to the open position and applying a coating of a coating material to the outside surface of the core pin. The method further includes moving the injection molding tool to the closed position. The method then includes filling the cavity space with a thermoplastic substrate material, the substrate material being maintained at a temperature wherein the substrate material exhibits plastic flow, thereby fusing the coating material to the substrate material. The method of the invention then includes cooling the substrate material to a temperature wherein the substrate material becomes substantially solid, thereby forming an article from the substrate material having a receptacle with an interior surface with the coating material fused thereto. The method then includes returning the molding tool to the open position; and removing the article.

11 Claims, 13 Drawing Sheets

RECEPTACLE WITH A FUSED COATING ON AN INTERIOR SURFACE AND AN INJECTION MOLDING PROCESS FOR FORMING THE ARTICLE

FIELD OF INVENTION

The present invention is generally related to injection molding and more particularly to formation of an article having a receptacle having a fused coating on the interior surface.

BACKGROUND

In many clinical evaluations it is necessary to obtain a sample of a patient's blood for analysis. Many of the specific analytical procedures require only the serum fraction of the patient's blood. Previously, practitioners generally used a hypodermic needle and syringe to make a penetration into the patient's vessel to draw a desired sample. The sample was then generally transferred to a tube, allowed to clot, then subjected to centrifugation to separate the serum fraction from the cellular fraction. With the advent of evacuated glass blood collection tubes, practitioners were able to use the tube in a needle holder with a double ended needle to collect the sample and then centrifuge the tube to separate the serum fraction. Since glass presents a hydrophilic surface that promotes clotting to the blood sample, the blood sample clotting process is readily initiated. When the tube containing the clotted blood is centrifuged, the cellular components do not tend to adhere to the glass, thus providing a substantially cell-free serum fraction for the desired analysis.

With the wide-spread recognition among medical and laboratory practitioners of the dangers of blood borne pathogens, manufacturers have begun to supply blood collection tubes formed from polymeric materials that are substantially more resistant to shattering caused by inadvertent mishandling than are the conventional glass tubes. While these polymeric tubes substantially reduced the incidence of shattered glass tubes, the polymeric materials, commonly polyethylene, polycarbonate, polyethylene terephthalate and the like, used to replace glass, present a hydrophobic surface to the blood samples. In an untreated polymeric tube, clotting is often difficult to initiate, and after centrifugation, there often is red blood cell hang-up or red cell film on the surface of the tube which may result in serum samples being contaminated with cells. A generally accepted definition of red cell hang-up is clumps of red blood cells or a substantially opaque coating of red blood cells on the tube wall. Red cell film is generally defined as a substantially sheer translucent coating of red blood cells on the tube wall.

U.S. Pat. No. 5,246,666 discloses additives for blood collection tubes that initiate clotting and induce the higher density cellular material to agglomerate at the bottom of the tube when it is centrifuged. While the disclosed additives assist the agglomeration of the cellular material during centrifugation, the problem of the cell hang-up and film on the tube walls still exists when polymeric materials are used to form the tubes.

U.S. Pat. Nos. 3,852,194 and 4,101,422 disclose addition of thixotropic gel materials to tubes that facilitate the separation between heavier and lighter blood fractions during centrifugation. The manufacture of these thixotropic gels must be carefully controlled and tubes containing these gels may have a shorter shelf life than the non-gel containing tubes. Additionally, the thixotropic gels may develop agglomerations or globules with lower specific gravity that separate from the bulk gel during centrifugation and interfere with the separation. Also, certain thixotropic gel materials may selectively absorb analytes from the blood samples thus confounding subsequent analytical procedures performed on the samples.

If a polymeric tube were available that additionally had surface properties to substantially eliminate red cell hang-up and film, that was substantially inert and unextractable from the tube inner surface and did not substantially reduce the efficiency of tube manufacture, the art of blood collection tubes would be advanced. Such a tube and a method for its manufacture are disclosed hereinbelow.

SUMMARY

An injection molding method of the present invention for forming an article having a receptacle with a coating on an interior surface includes providing an injection molding tool with at least one cavity in one part and at least one core pin projecting from a second part having an outside surface. The core pin is sized to fit within the cavity with a clearance thereby defining a cavity space. The injection molding tool has an open position wherein the core pin is withdrawn from the cavity and a closed position wherein the core pin is disposed within the cavity for defining the cavity space. The method further sequentially then includes moving the injection molding tool to the open position and applying a coating of a fusible coating material to the outside surface of the core pin. The method further includes moving the injection molding tool to the closed position. The method then includes filling the cavity space with a thermoplastic substrate material, the substrate material being maintained at a temperature wherein the substrate material exhibits plastic flow, thereby fusing the coating material to the substrate material. The method of the invention then includes cooling the substrate material to a temperature wherein the substrate material becomes substantially solid, thereby forming an article from the substrate material having a receptacle with an interior surface with the coating material fused thereto. The method then includes returning the molding tool to the open position; and removing the article.

The method of the invention provides practitioners with a simple procedure to form a substantially non-removable coating on the inside surface of a receptacle. An example of such a non-removable coating is given for applying a hydrophilic inner surface to a receptacle such as a blood collection tube. The hydrophilic inner surface of the tube is formed as a coating fused to a polymeric substrate material forming the tube. Prior methods such as spraying the material directly onto the inside surface of an already formed receptacle do not provide a fused coating onto the surface. Additionally, when the receptacle is a cylinder with a large depth to axis ratio, secondary coating operations are difficult. It is often difficult to achieve a substantially uniform coating when attempting to spray coat a long narrow receptacle, such as a body fluid collection tube. Any attempt to fuse the sprayed coating onto the tube substrate then requires an additional secondary operation. The method of the invention adds only a simple step, applying a coating to the core pin, followed by the normal injection molding process. The introduction of the molten thermoplastic resin substrate is conducted in a normal injection molding fashion. By introducing the molten resin, the coating material fuses to the substrate and most inconsistencies in the coating are flowed to substantial uniformity. The tube of the invention substantially eliminates red cell hang-up, red cell film and contamination of the serum layer with cellular material after centrifugation.

DETAILED DESCRIPTION

Figure 1:
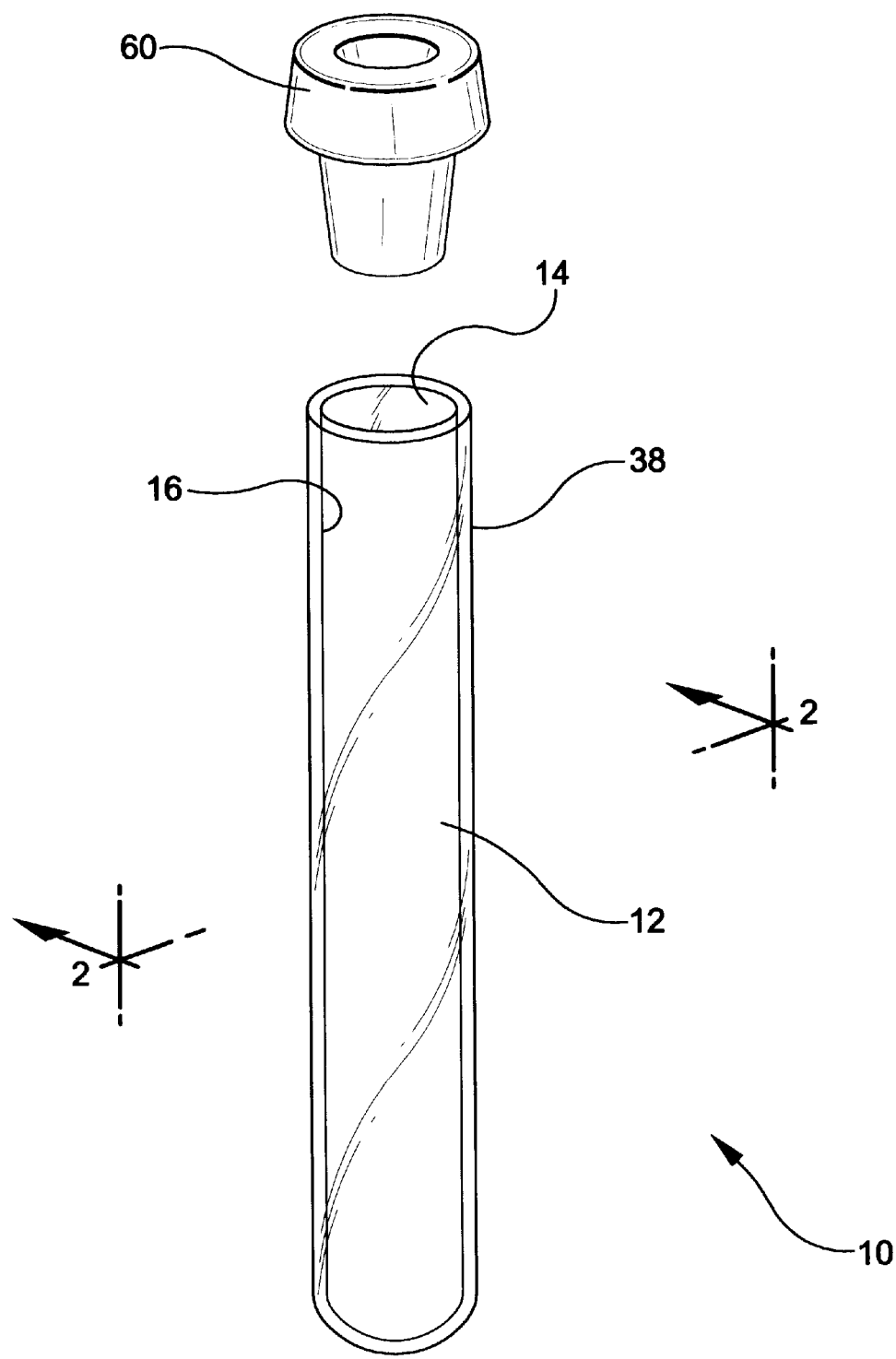
FIG. 1 is an exploded perspective view of an article of the invention formed by the method of the invention.

While this invention is satisfied by embodiments in many different forms, there are shown in the drawings and herein described in detail preferred embodiments of the invention with the understanding that the present disclosure is to be considered exemplary of the principles of the invention and is not intended to limit the invention to the embodiments illustrated. The scope of the invention is measured by the appended claims and their equivalents.

Referring to FIGS. 1–10, an injection molding method of the present invention for forming an article 10 having a receptacle 12 with a coating 14 on an interior surface 16 includes providing an injection molding tool 20 with at least one cavity 22 in one part 24 and at least one core pin 26 projecting from a second part 28 having an outside surface 30. Core pin 26 is sized to fit within cavity 22 with a clearance "a" thereby defining a cavity space 32. Injection molding tool 20 has an open position, best seen in FIGS. 3 and 4, wherein core pin 26 is withdrawn from cavity 22 and a closed position, best seen in FIG. 5, wherein core pin 26 is disposed within cavity 22 for defining cavity space 32. The method further sequentially then includes moving injection molding tool 20 to the open position and applying a layer 34 of a fusible, preferably thermoplastic, coating material 36 to outside surface 30 of core pin 26. The method further includes moving injection molding tool 20 to the closed position. The method then includes filling cavity space 32 with a thermoplastic substrate material 38, substrate material 38 being maintained at a temperature wherein substrate material 38 exhibits plastic flow, thereby fusing coating material 36 to substrate material 38. The method of the invention then includes cooling the substrate material to a temperature wherein substrate material 38 becomes substantially solid, thereby forming article 10 from the substrate material having receptacle 12 with interior surface 16 with coating material fused 36 thereto. The method then includes returning molding tool 20 to the open position; and removing article 10.

Figure 2:
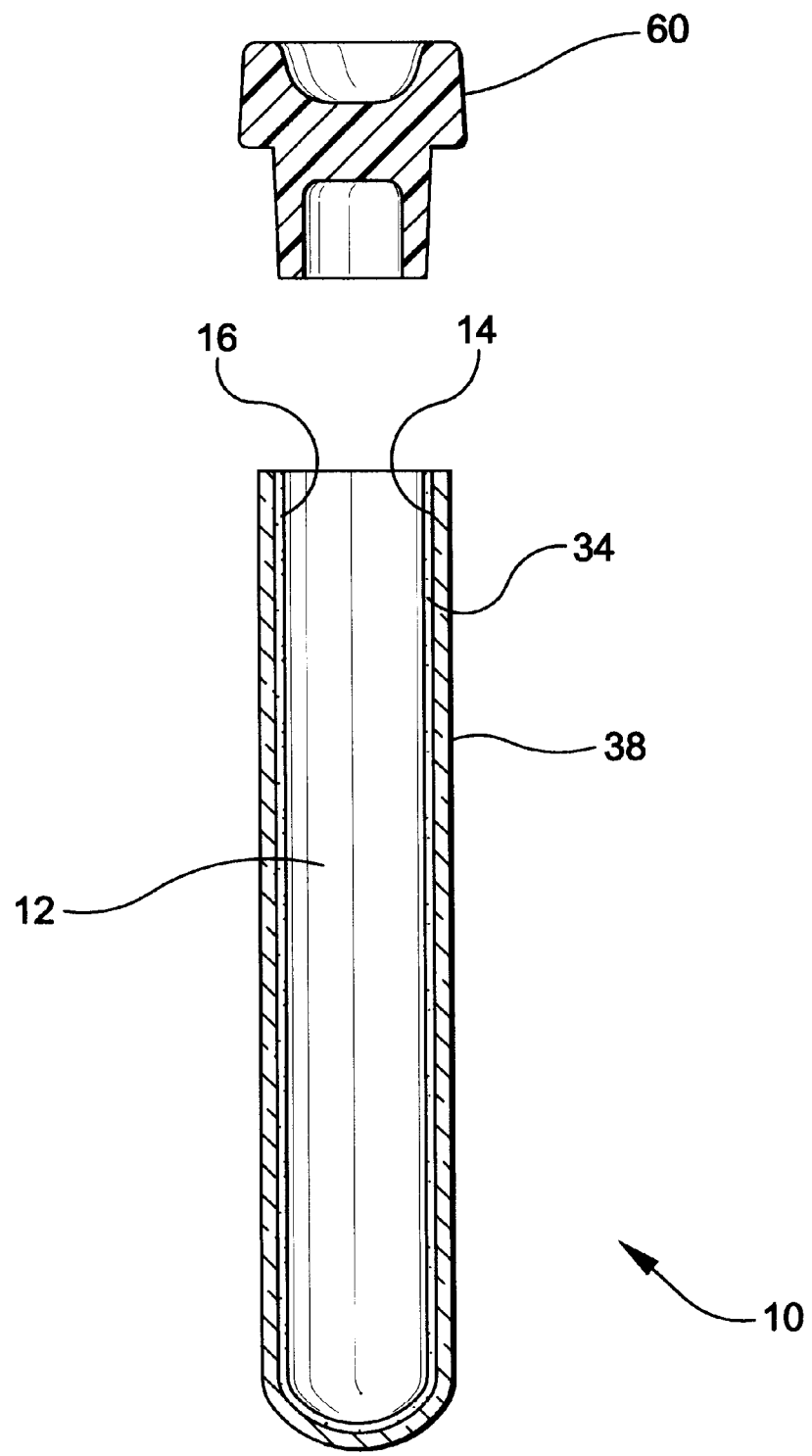
FIG. 2 is a cross-sectional view of the article of FIG. 1 taken along the line 2—2.
Figure 3:
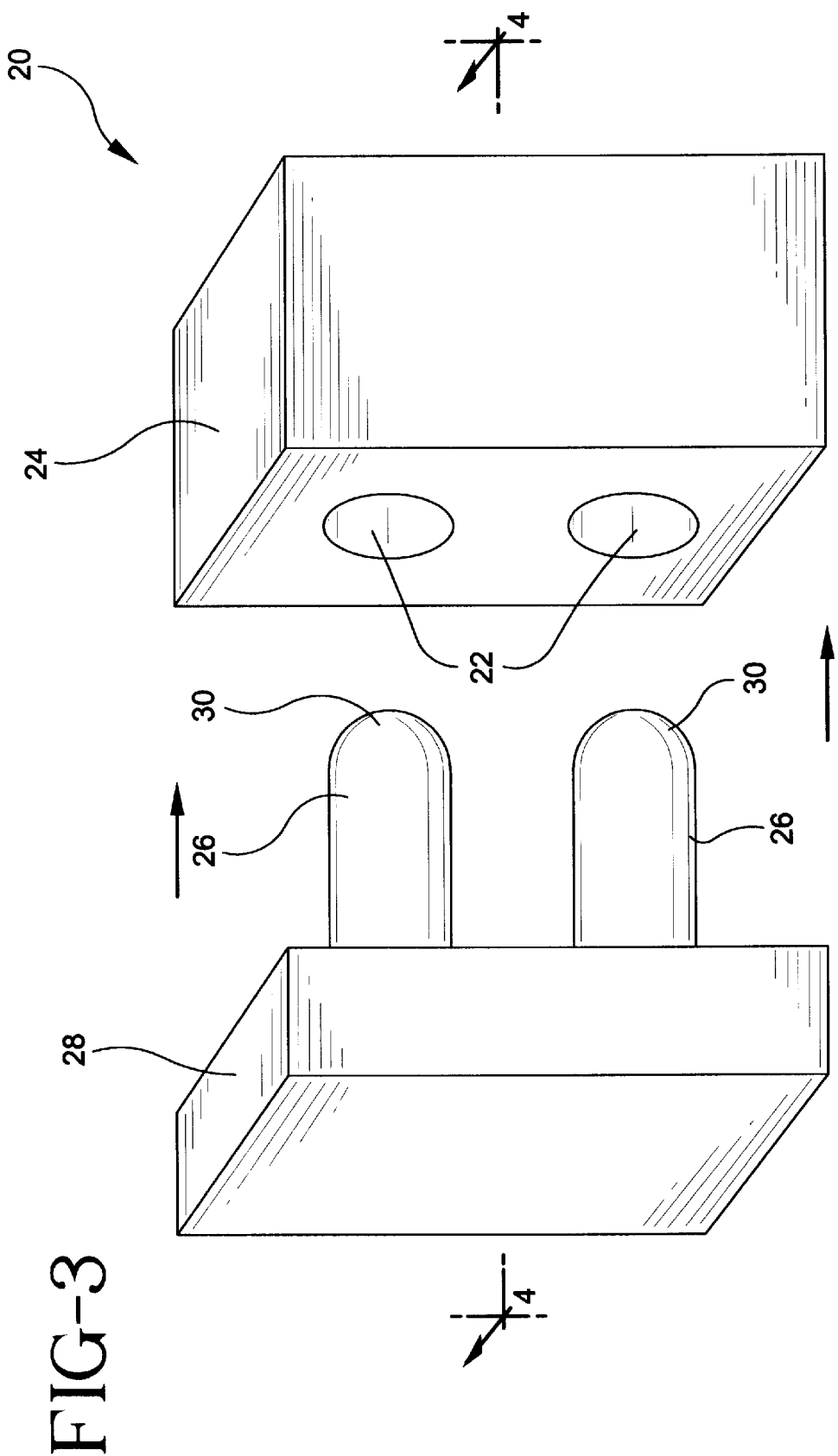
FIG. 3 is a schematic perspective view of an injection molding tool used for forming the article of the invention.
Figure 4:
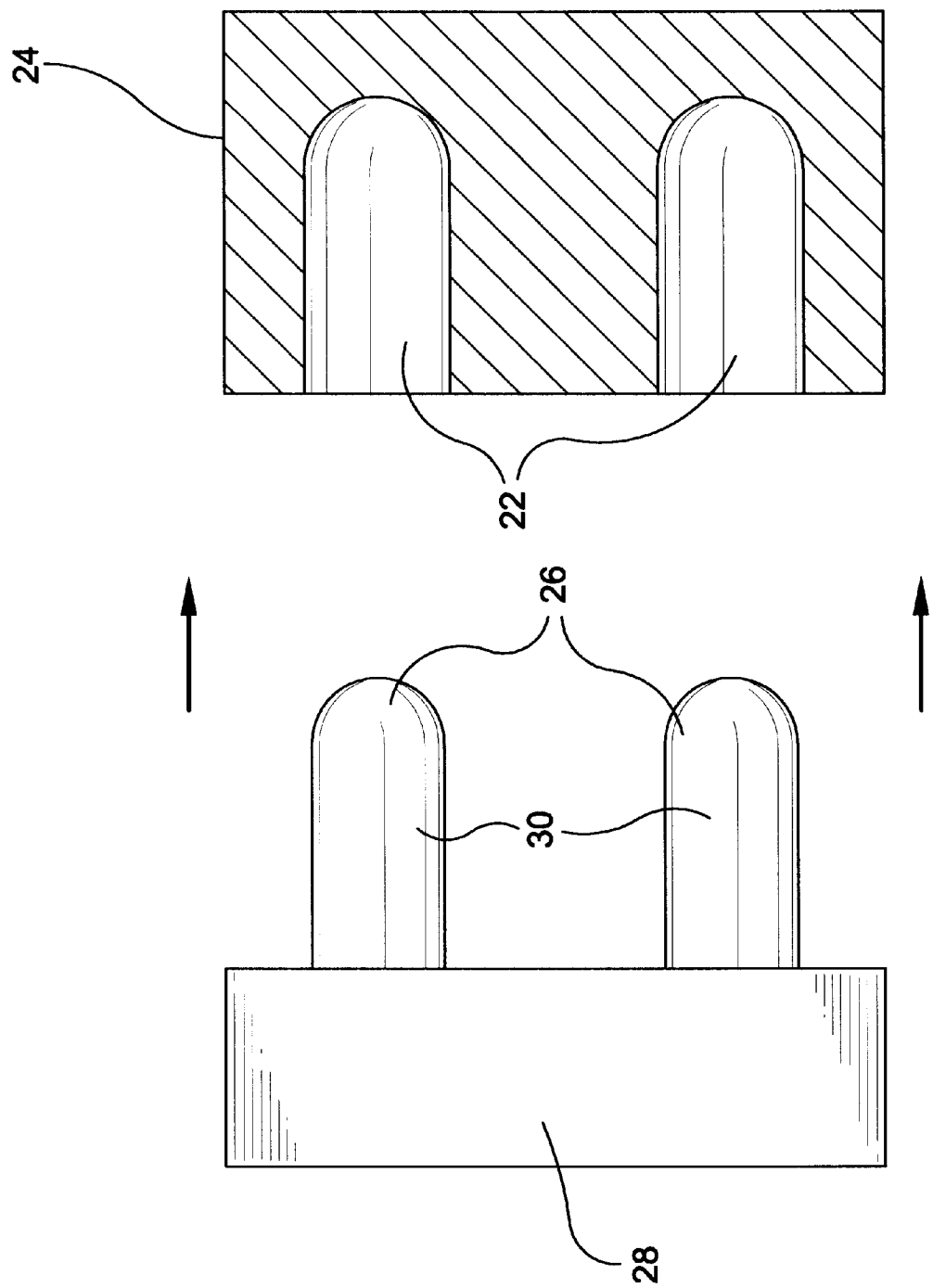
FIG. 4 is a schematic cross-section view of the injection molding tool of FIG. 3 taken along the line 4—4.
Figure 5:
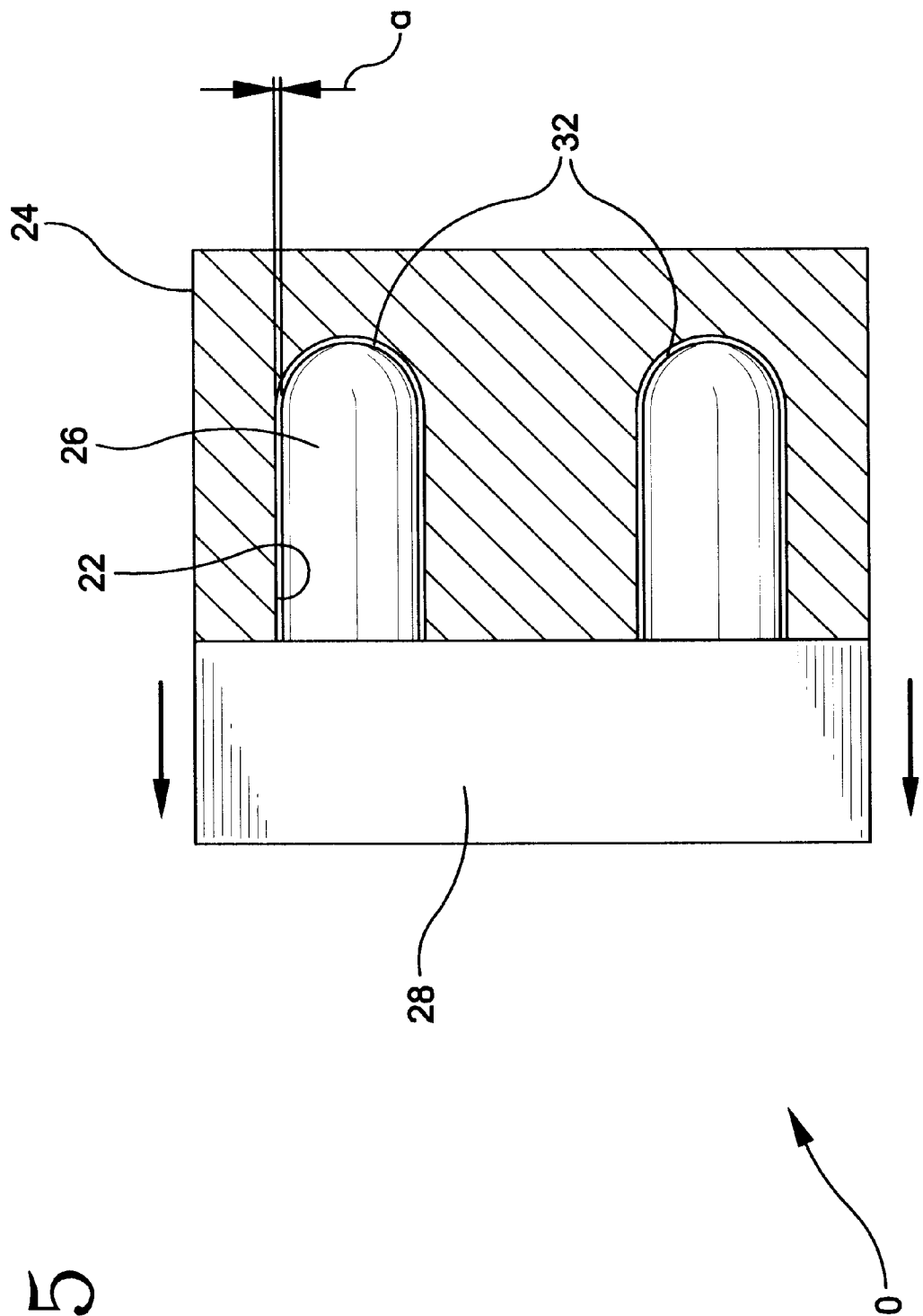
FIG. 5 is a schematic cross-sectional view, analogous to FIG. 4, of the injection molding tool in the closed position.

For the purpose of illustrating, but not limiting the method of the invention, article 10 is a tube suitable for blood collection as shown in FIGS. 1 and 2. Again, for the purpose of illustrating the method of the invention, the fusible coating material is intended to render the hydrophobic inner surface of the tube substantially more hydrophilic. Other applications of substantially non-removable coatings for purposes such as reducing gas permeation, reducing water permeation, surface treatments and the like to the inner surfaces of receptacles formed by injection molding are envisioned and are considered within the scope of the instant disclosure.

Figure 6A:
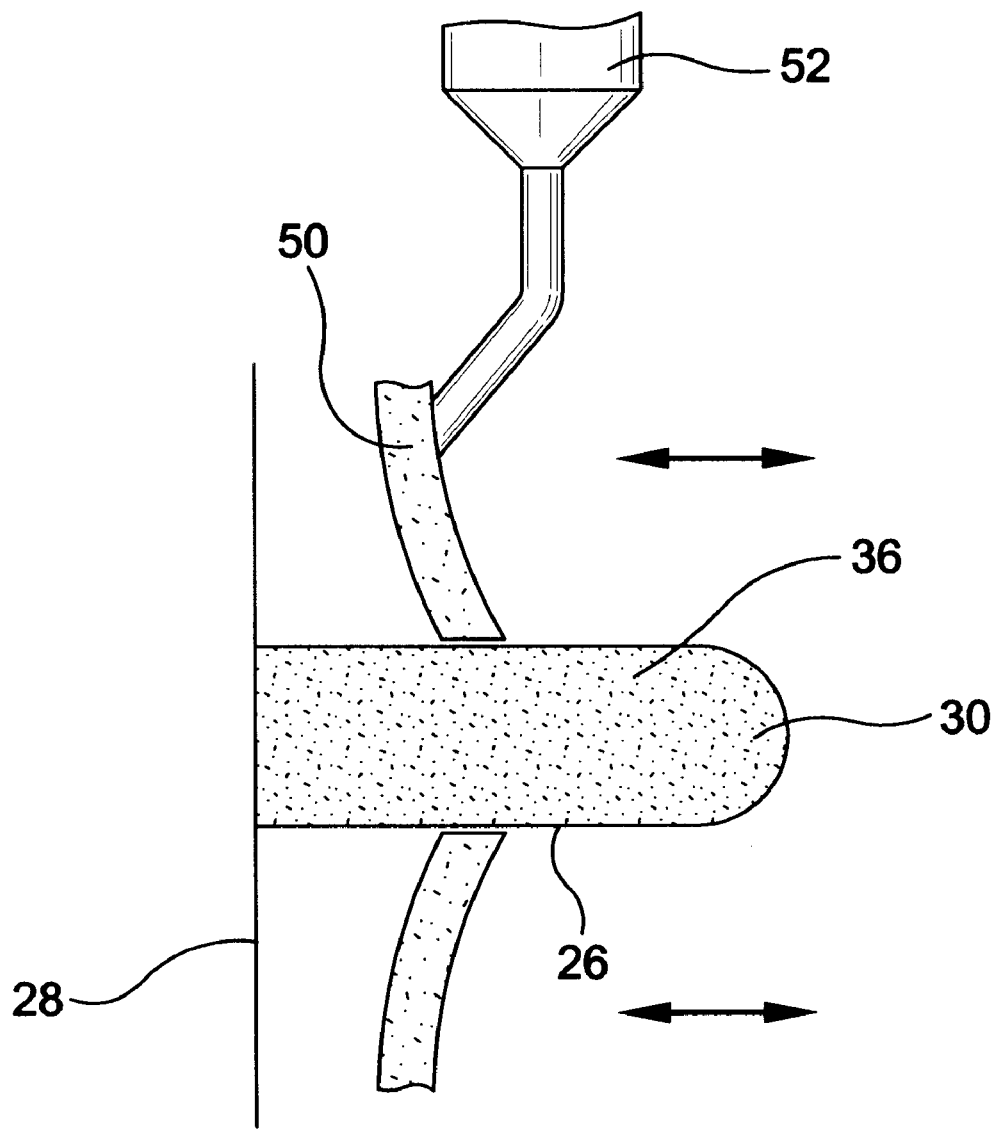
FIG. 6a is a schematic view of the core pin portion of the injection molding tool of FIGS. 3, 4 and 5 indicating a coating process.
Figure 6B:
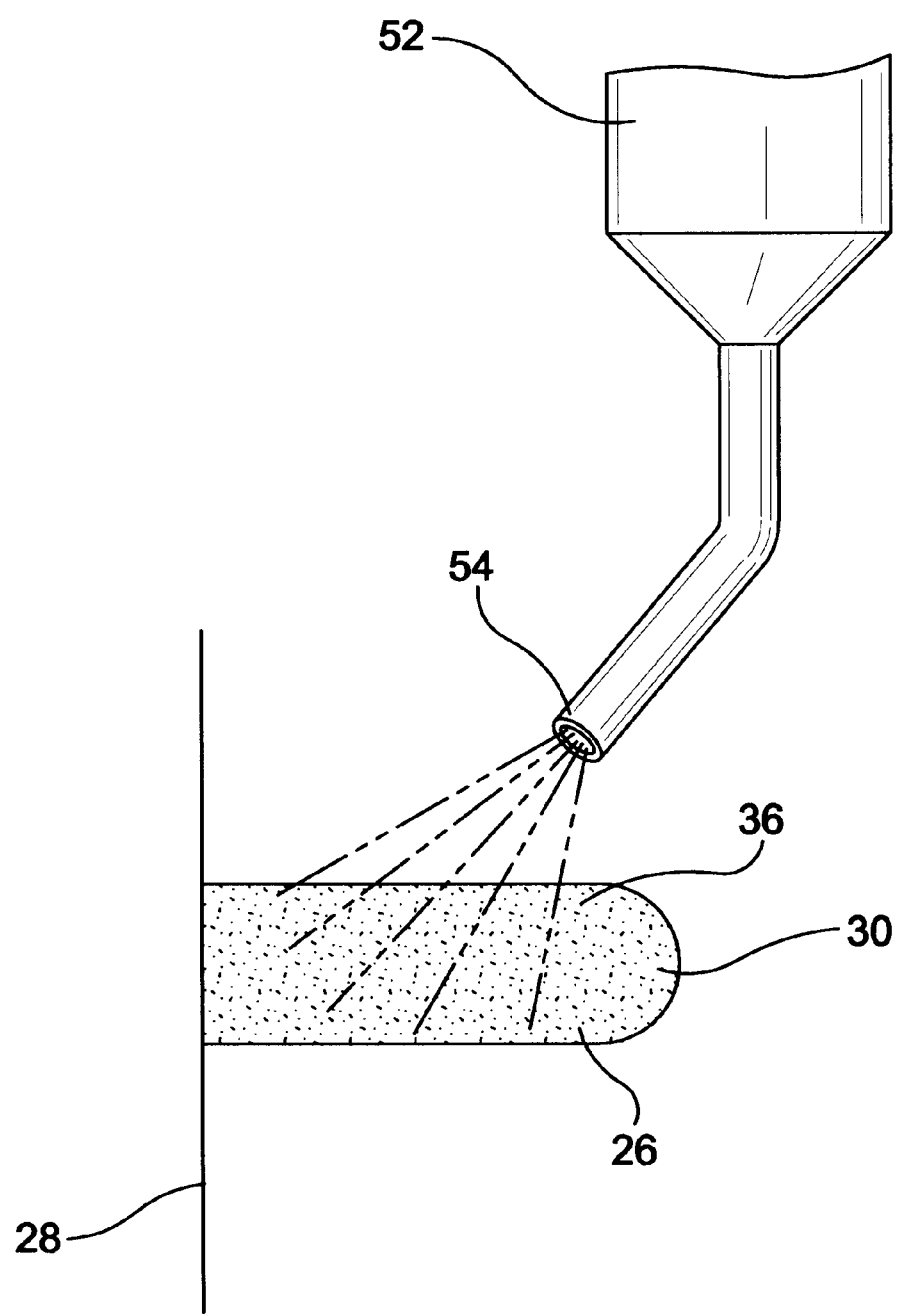
FIG. 6b is another schematic view, analogous to FIG. 6a, of another coating process.
Figure 6C:
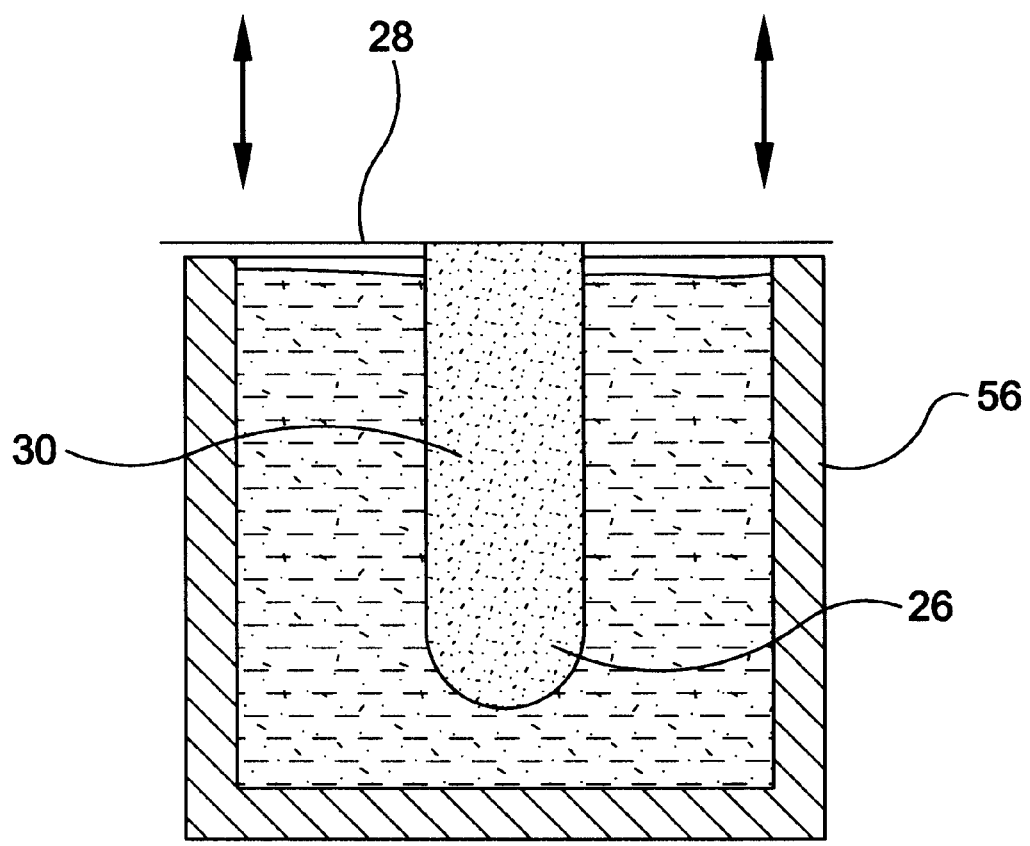
FIG. 6c is another schematic view, analogous to FIG. 6a, of another coating process.
Figure 6D:
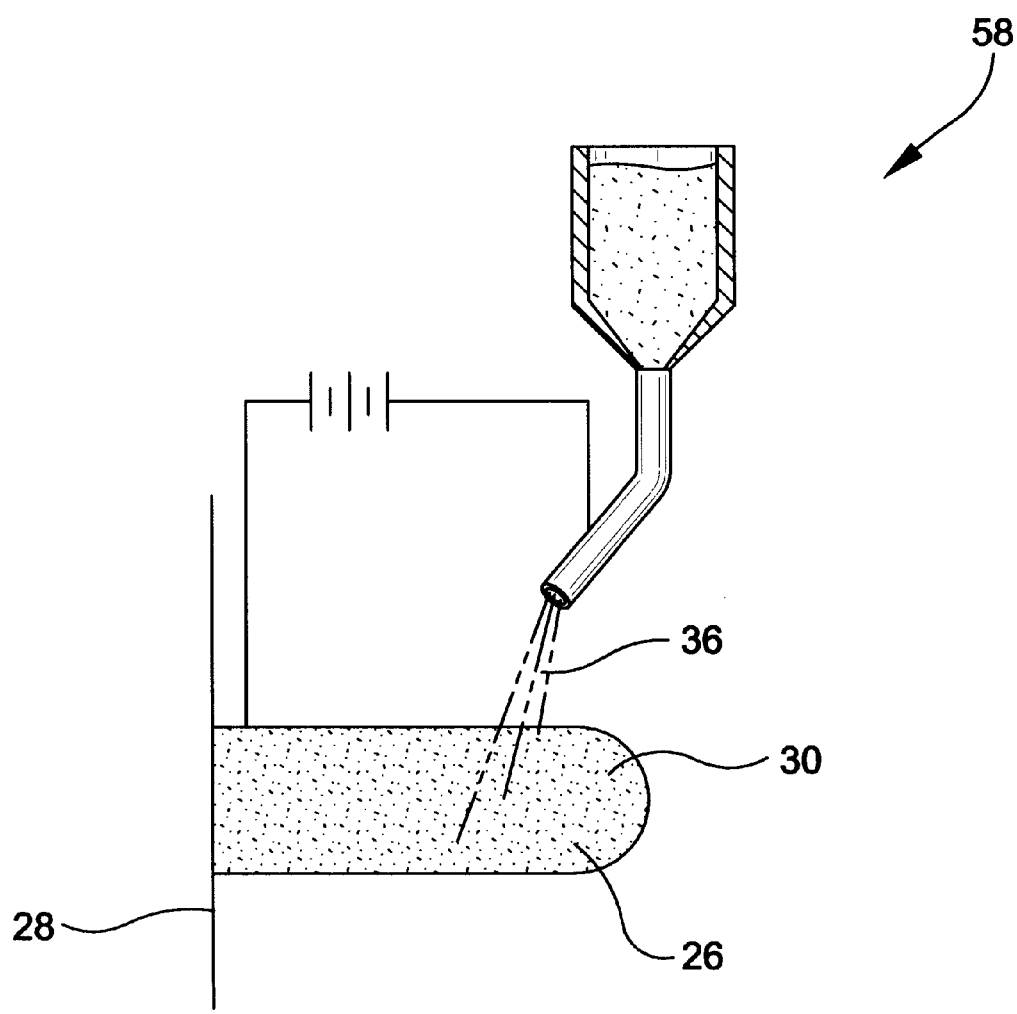
FIG. 6d is another schematic view, analogous to FIG. 6a, of yet another coating process.

Referring to FIGS. 6a, 6b, 6c and 6d, thermoplastic coating material 36 is preferably at least dispersible in a fugitive solvent and may be applied to outside surface 30 of the core pin by wiping the solvent containing the coating material onto core pin surface 30. The material may be applied to the surface with a resilient wiper 50 that is replenished from a reservoir 52 as shown in FIG. 6a, spraying the solvent containing the coating material onto core pin surface 30 with a spray head 54 replenished from reservoir 52 as shown in FIG. 6b or dipping core pin 26 into a vessel 56 of the solvent containing the coating material as shown in FIG. 6c. Alternatively, electrostatic powder coating using an electrically charged system 58 to direct the finely divided coating material 36 onto core pin surface 30 as illustrated in FIG. 6d and the like. The dipping process would necessitate a vertical arrangement of the injection molding apparatus. Other coating methods may be envisioned and are to be considered within the scope of the invention.

Suitable materials for use as a substrate include, but are not limited to, polyethylene, polypropylene, polycarbonate, polyethylene terephthalate, and the like.

Suitable solvents for application of the coating have an appreciable vapor pressure at ambient conditions. Representatives of these solvents include, but are not limited to, acetone, water, methylene chloride, ethyl acetate, chloroform, carbon tetrachloride, methyl alcohol, ethyl alcohol, isopropyl alcohol, hydrochlorofluorocarbons, chlorofluorocarbons, hydrocarbons with fewer than about seven carbon atoms and miscible mixtures and suspensions thereof.

Suitable coating materials preferably are polymeric materials including, but not limited to, vinyl alcohol, vinyl pyrollidone, polyethylene terephthalate polyethylene oxide copolymer, polyethylene terephthalate polypropylene oxide copolymer, polyethylene oxide, polypropylene oxide, polyacrylates, styrene sulfonate, vinyl phosphonate, polyalkylamines and salts thereof, polysaccharides and copolymers thereof.

When selecting materials for the substrate and the coating materials, a coating material should be selected so that, when the substrate is injected into the molding tool after the core pin is coated with the coating material, the coating material fuses with the substrate material. When polyethylene terephthalate (PET) is selected as the substrate, a copolymer of PET with polyethylene oxide (PEO) is preferred as the coating material as the PET/PEO copolymer fuses with the PET substrate during the injection molding process.

The liquid mixture to be applied to the core pin may contain the coating material in a ratio (weight/volume) between about 0.05 parts coating material per one hundred parts solvent to about ten parts coating material to about one hundred parts solvent. For particular applications, the ratio of coating material to solvent may be smaller, and, as shown in FIG. 6d, the polymeric coating material may also be applied using electrostatic powder coating techniques with finely divided material being applied directly to the core pin outside surface.

A liquid coating mixture containing between about 0.5 parts to about 1.5 parts (weight solids) polyethylene terephthalate copolymer with polypropylene oxide or polyethylene oxide copolymer is mixed with one hundred parts (volume solvent) acetone for application by wiping to the core pin was successfully used in demonstrating the method of the invention on a blood collection tube wherein the substrate resin was polyethylene terephthalate. In production, a spray method utilizing an ultrasonic spray nozzle is expected to provide a substantially uniform coating of the material to core pin surface 30. Suitable polyethylene terephthalate polyethylene oxide (PEO) copolymers are trade named "Milease T" (a 14% solids aqueous suspension) and "Milease 7261" (a 100% solids material) and are available from Hodgson Process Chemical, Inc., Mount Holly, N.C. Other suitable copolymers are trade named "Raycalube PC" (20% solids aqueous suspension) also available from Hodson, and Pluronic F68 and F108 available from BASF, Inc., Parsippany, N.J.

A series of experiments was performed by coating core pins in an injection mold with solution containing several concentrations of Milease 7261, Milease T and Raycalube PC then forming blood collection tubes from polyethylene terephthalate (PET). For each example, the PET tubes were functionally tested with freshly drawn human volunteer blood and physically tested by Electronic Spectra for Chemical Analysis (ESCA) at three locations (top, middle, bottom) within the tube for carbon/oxygen ratio. In both the functional and the physical testing, control PET tubes were similarly tested and the results compared to the coated tubes. Additional information regarding the physical state of the coating material was provided by comparison of coated PET tubes prepared by the method of the invention to already formed PET tubes. The already formed PET tubes were coated by filling the already formed PET tubes with the same liquid coating solution used to coat core pins in the method of the invention, then aspirating the liquid to leave a residue of the coating material inside the tubes. Both the tubes prepared by the method of the invention and the "fill and aspirate tubes" were extracted with water for 24 hours at ambient conditions. The aqueous extract was then analyzed by Fourier Transform Infrared Spectroscopy (FTIR). The results of the FTIR indicated that the coating on the coated PET tubes prepared by the method of the invention was not removed by the aqueous extraction, while the PET tubes prepared by the "fill and aspirate" method had the coating substantially removed by the aqueous extraction.

EXAMPLES

PET tubes were coated with PET/PEO copolymer by wiping core pin 26 of injection molding tool 20 used for forming 13×100 mm PET tubes for blood collection with solutions of several concentrations of the copolymer and forming tubes from PET.

a.) Solutions of Raycalube PC at 0.25%, 0.5% and 1.0% (wt./vol.) in acetone were prepared. The solution was wiped onto the core pin prior to each molding cycle of forming PET tubes.

b.) Solutions of Milease T at 0.5%, 1.0% and 2.0% (wt./vol.) in acetone were prepared. The solution was wiped onto the core pin prior to each molding cycle of forming PET tubes.

c.) Solutions of Milease 7261 at) 0.25%, 0.5% and 1.0% (wt./vol.) in acetone were prepared. The solution was wiped onto the core pin prior to each mold cycle of forming PET tubes.

Figure 7:
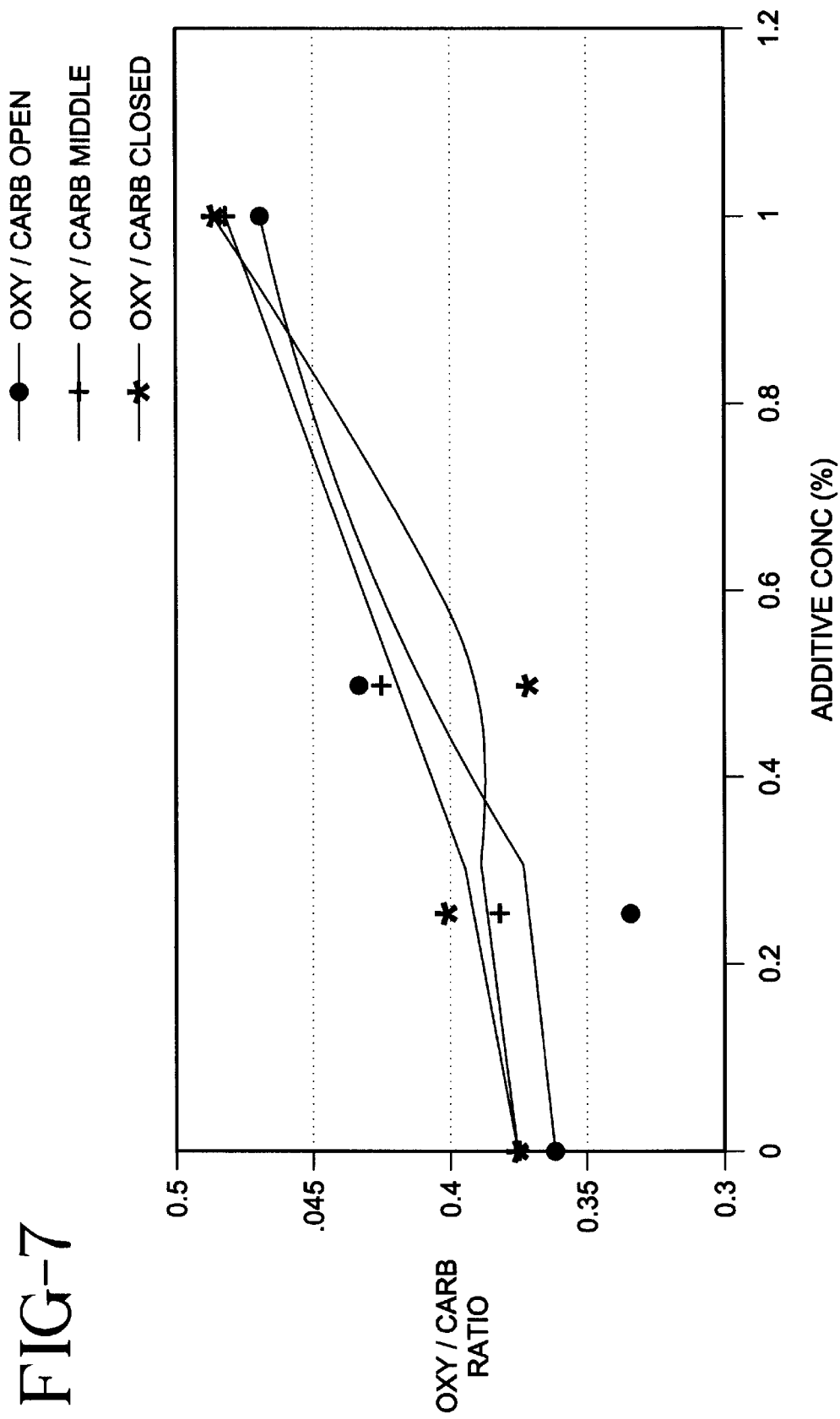
FIG. 7 is a graphical representation of ESCA spectral data from one coating material.
Figure 8:
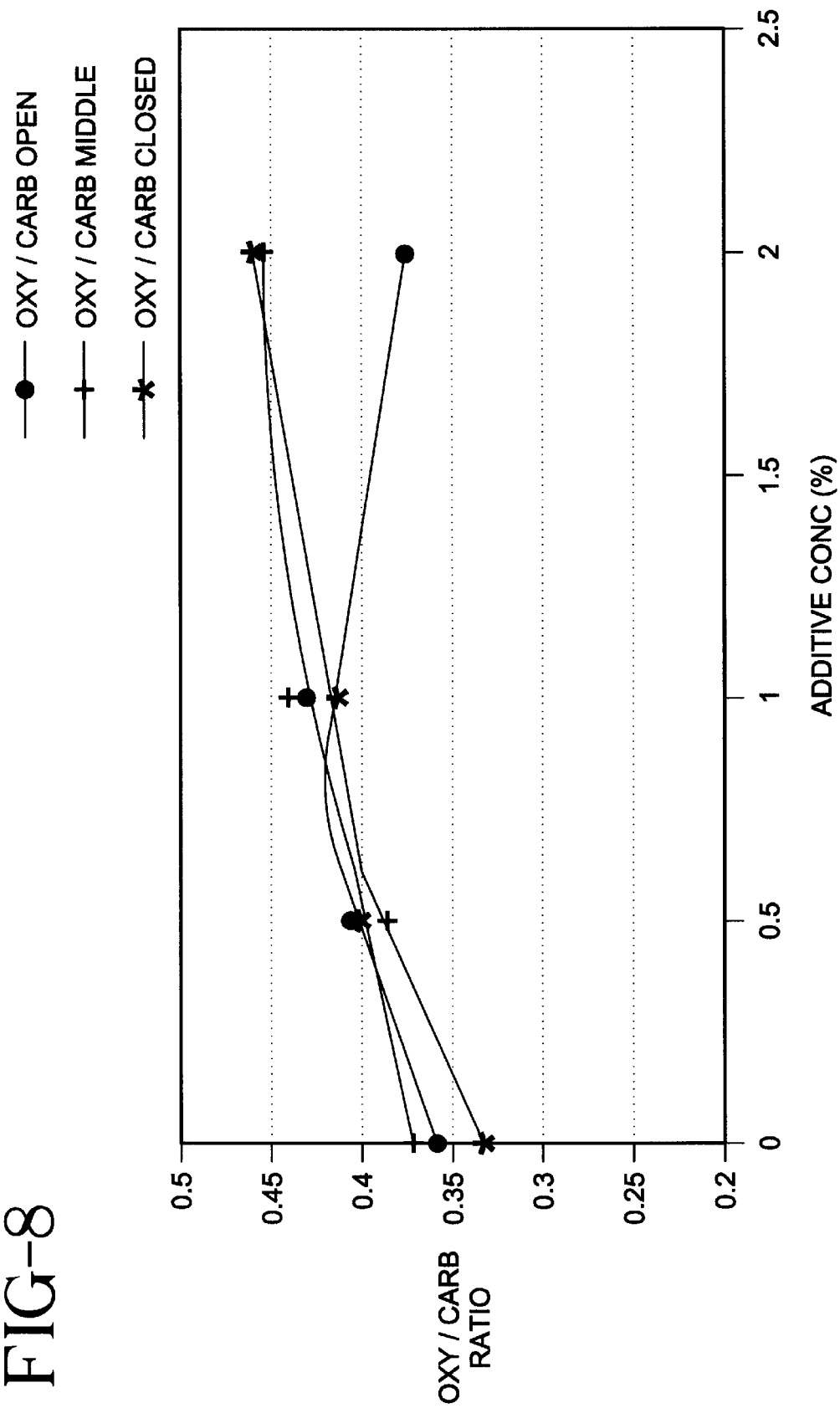
FIG. 8 is a graphical representation of ESCA spectral data from another coating material.
Figure 9:
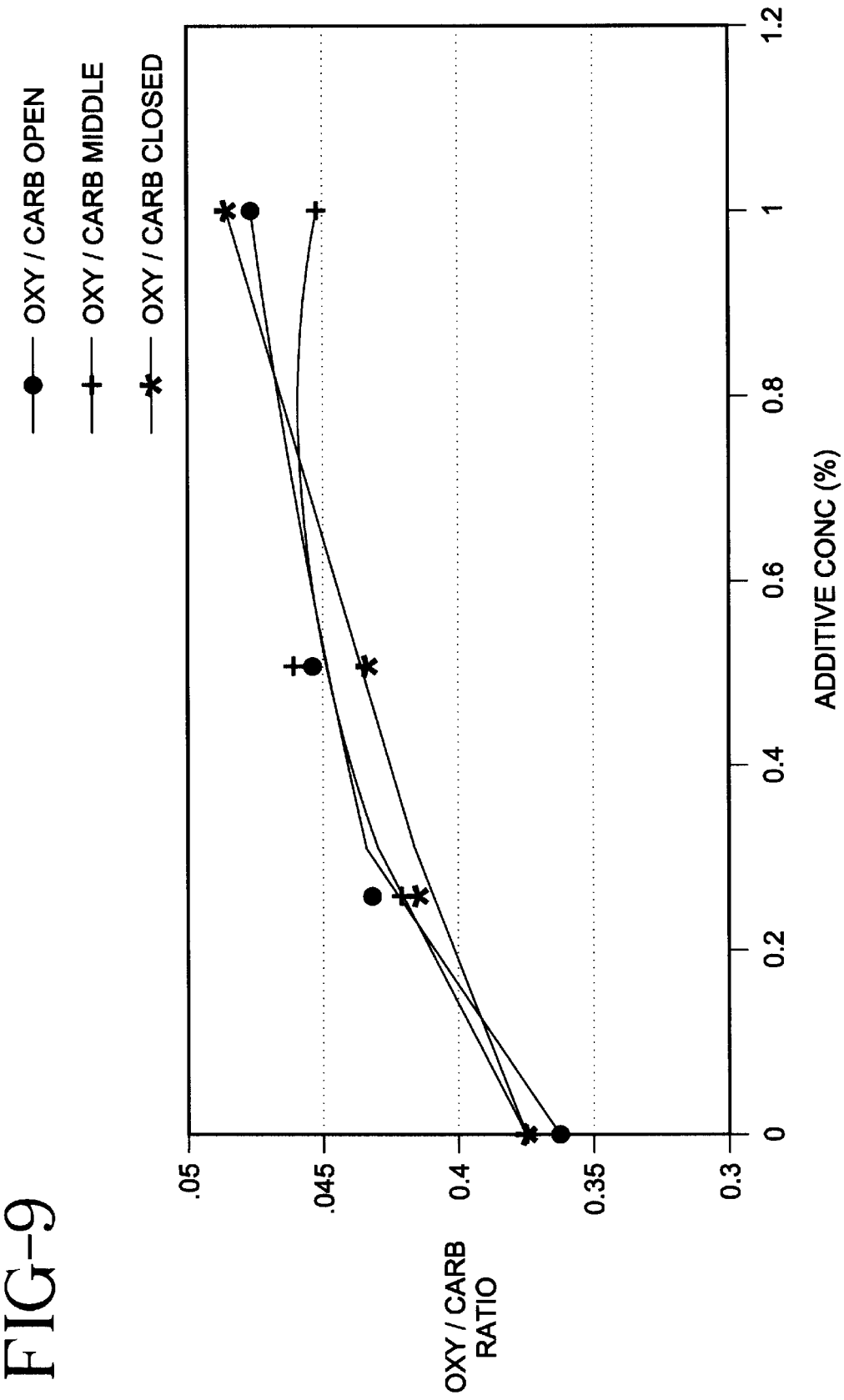
FIG. 9 is a graphical representation of ESCA spectral data from yet another coating material.
Figure 10:
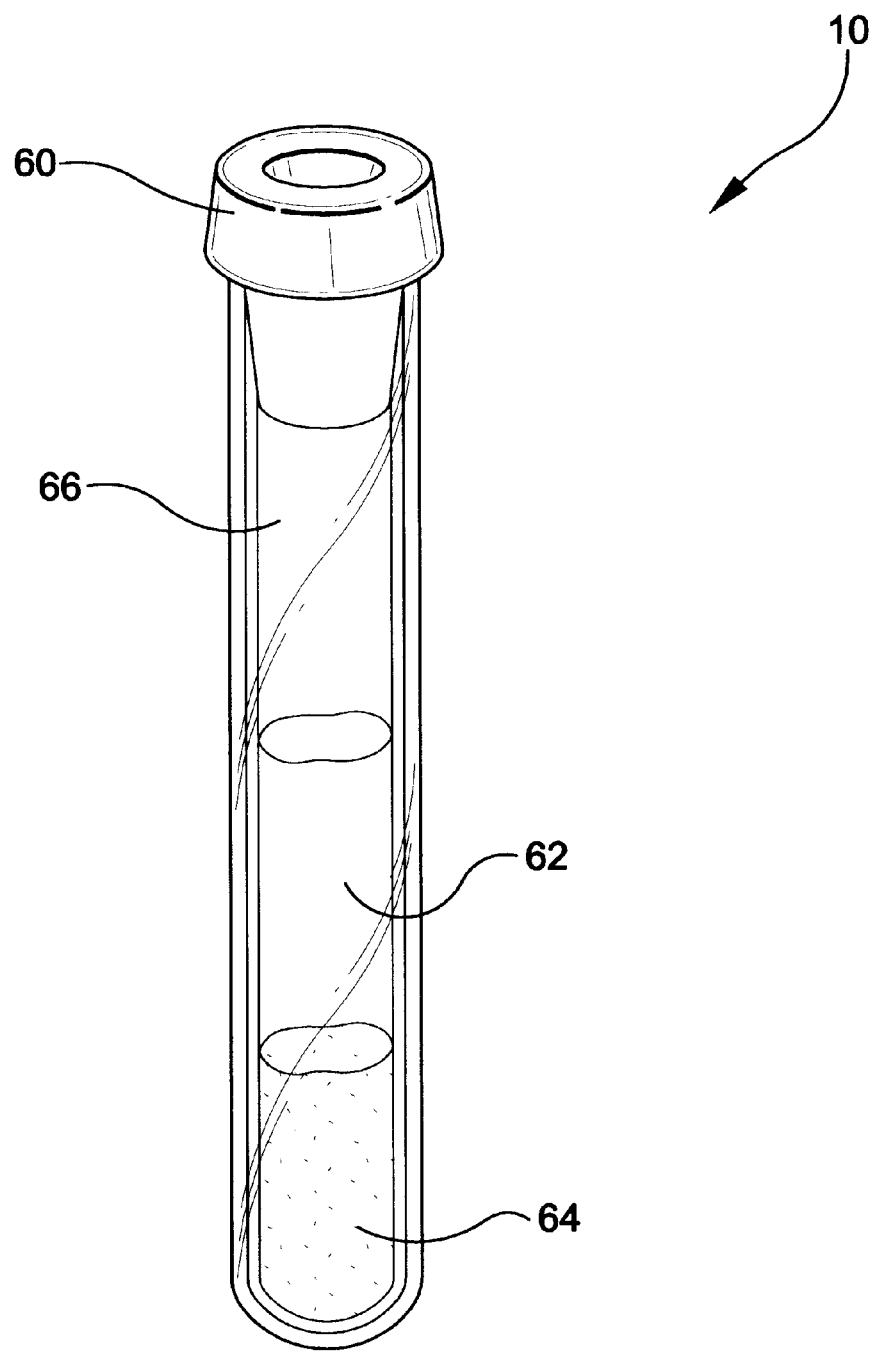
FIG. 10 is a perspective view of a preferred blood collection tube formed using the method of the present invention containing a blood specimen after centrifugation.

As shown in the results graphically illustrated in FIGS. 7–9, the tubes prepared above were evaluated by ESCA for oxygen/carbon ratio at three locations (open end, middle and closed end) within each tube for the several coating concentrations. FIG. 7 graphically illustrates the Raycalube PC results; FIG. 8 graphically illustrates the Milease T results; and FIG. 9 illustrates the Milease 7261 results. The results of these evaluations were compared to the oxygen/carbon ratio of conventional PET tubes (control, 0% additive concentration) prepared by wiping the core pins only with acetone instead of with the solutions in Examples a–c.

The ESCA results showed that the control tubes have an oxygen/carbon ratio between about 0.35 to about 0.4 while the oxygen/carbon ratio of the treated tubes approached 0.5 at the higher concentrations of the wiping solutions. As reported above, the coating of tubes prepared by the wipe core and injection mold method of the invention was substantially unchanged by water extraction while the same coating applied directly to already formed tubes was removed by the water. The water extraction resistance of the coating in tubes prepared by the method of the invention provides substantial confirmation for the fusion of the PET copolymer coating material to the PET substrate material of the tube.

The example tubes additionally had an application of a conventional polyvinylpyrrolidone/silica spray to the coated tubes to enhance clot activation, were fitted with resilient elastomeric stoppers 60. Suitable resilient materials for the stoppers include, but are not limited to, natural rubber, butyl rubber, ethylene propylene diene monomer (EPDM) and the like. The tubes were then evacuated and sealed with the stoppers. Referring to the table below and FIG. 10, functional testing of coated tubes was then performed. Fresh human volunteer donor blood was introduced into the tubes and the tubes were each inverted 5 times to induce clot formation. The blood containing tubes were allowed to stand 60 minutes at ambient conditions and then centrifuged at 1000 RCF for 10 minutes at 25° C. to separate serum from cellular material. After centrifugation, tubes 10 had the general appearance shown in FIG. 10. The example tubes were then examined for the presence of red cell film and red cell hang-up in a lower specific gravity (top portion) serum fraction 62 of the tube. A higher specific gravity region 64 includes cellular materials such as red blood cells. It is generally undesirable to have red blood cells present in an area 66 above or in serum fraction 62. The presence of red cells in this region causes serum samples to be unsatisfactory for many analytical procedures. Two samples of each type tube were tested. The results are as follows:

| Tube Type | Visual Observation Tube 1 | Tube 2 |
| --- | --- | --- |
| Milease T 0.5% | No red cell hang-up, No red cell film | No red cell hang-up, No red cell film |
| Milease 7261 0.25% | No red cell hang-up, red cell film | +1 red cell hang-up, red cell film |
| Raycalube PC 0.25% | No red cell hang-up, red cell film at air interface | No red cell hang-up, red cell film |

-continued

| Tube Type | Visual Observation Tube 1 | Tube 2 |
|---|---|---|
| Milease T 2.0% | No red cell hang-up, no red cell film | No red cell hang-up, No red cell film |
| Milease 7261 1.0% | No red cell hang-up, patch of red cell film | No red cell hang-up, patch of red cell film |
| Raycalube PC 1.0% | No red cell hang-up, red cells entrapped at interface | No red cell hang-up, No red cell film |
| Negative control (untreated PET substrate) | +2 red cell hang-up, Red cell film (+2 red cell hang-up is defined as between about >75% surface coverage to no spin-down) | +1 red cell hang-up, Red cell film (+1 red cell hang-up is defined as between about 10% to about 75% surface coverage) |

Based on the ESCA results and the functional testing with human blood, the higher concentrations of the several coating materials apparently result in a more uniform and substantially continuous coating of the hydrophilic coating material on the inner surface of the tubes. The results of the water extraction test suggest that the PET copolymer is fused to the PET substrate of the tube. The results suggest that the method of coating the core pin with a material capable of fusing with the substrate is suitable for applying other coatings, colorant, lubricous layers, gas barrier layers and the like to injection molded articles in a simple process that does not adversely effect the efficiency or the article or require additional molding steps or tooling.

What is claimed is:

1. An injection molding method for forming an article having a receptacle with a coating on an interior surface comprising:

providing an injection molding tool comprising at least one cavity in one part and a core pin projecting from a second part having an outside surface sized to fit within said cavity with a clearance thereby defining a cavity space, said injection molding tool having an open position wherein said core pin is withdrawn from said cavity and a closed position wherein said core pin is disposed within said cavity for defining said cavity space;

moving said injection molding tool to said open position;

applying a layer of a fusible coating material to said outside surface of said core pin;

moving said injection molding tool to said closed position;

filling said cavity space with a thermoplastic substrate material, said substrate material being maintained at a temperature wherein said material exhibits plastic flow, thereby fusing said coating material to said substrate material;

cooling said substrate material to a temperature wherein said substrate material becomes solid, thereby forming an article from said substrate material having a receptacle with an interior surface having said coating material fused thereto;

moving said molding tool to said open position; and removing said article from said molding tool.

2. The process of claim 1 wherein said applying step comprises applying a liquid mixture of a thermoplastic coating material selected to be at least dispersible in a fugitive solvent and allowing said fugitive solvent to evaporate.

3. The process of claim 2 wherein said applying step further comprises selecting as said thermoplastic coating material a water dispersible polymeric material and preparing said liquid mixture with said fugitive solvent being selected from the group consisting of acetone, methylene chloride, methylene chloride, ethyl acetate, chloroform, carbon tetrachloride, ethyl alcohol, methyl alcohol, isopropyl alcohol, hydrochlorofluorocarbons, chlorofluorocarbons, hydrocarbons with fewer than seven carbon atoms and mixtures thereof.

4. The process of claim 3 wherein said applying step further comprises selecting as said thermoplastic coating material a thermoplastic material fusible with said substrate material.

5. The process of claim 3, wherein said preparing step further comprises selecting a ratio (wt./vol.) of said coating material to said fugitive solvent between about 0.05 parts per one hundred parts to about 10 parts to one hundred parts.

6. The process of claim 5 wherein said preparing step further comprises selecting as said thermoplastic coating material a polymeric material from the group consisting of polyethylene terephthalate, vinyl alcohol, vinyl pyrollidone, polyethylene oxide, polypropylene oxide, polyacrylates, styrene sulfonate, vinyl phosphonate, polyalkylamines and salts thereof, polysaccharides, and copolymers thereof.

7. The process of claim 6 wherein said preparing step further comprises selecting a copolymer of polyethylene terephthalate and polyethylene oxide.

8. The process of claim 7 wherein said preparing step further comprises selecting a concentration of said copolymer (wt./vol.) between about 0.5 parts copolymer per one hundred parts acetone to about 1.5 parts copolymer per one hundred parts acetone.

9. The process of claim 2 wherein said applying step for said liquid coating material is selected from the group consisting of wiping said liquid onto said core pin, spraying said liquid onto said core pin and dipping said core pin into said liquid.

10. The process of claim 9 wherein said applying step comprises spraying said core pin surface with said liquid coating material using an ultrasonic spray nozzle, thereby applying a substantially uniform coating of said coating material to said core pin surface.

11. The process of claim 1 wherein said applying step comprises electrostatic application of a finely divided thermoplastic material to coat said outside surface of said core pin.

* * * * *